June 24, 1924.  A. ANDERSON  1,498,772
STARTING CRANK LOCK
Filed Jan. 25, 1923
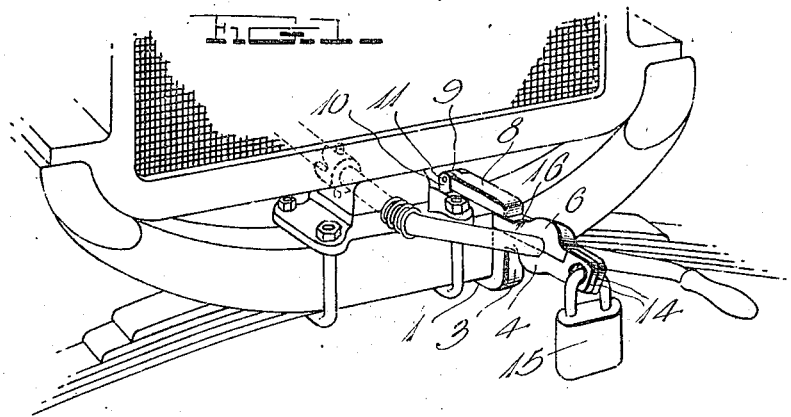
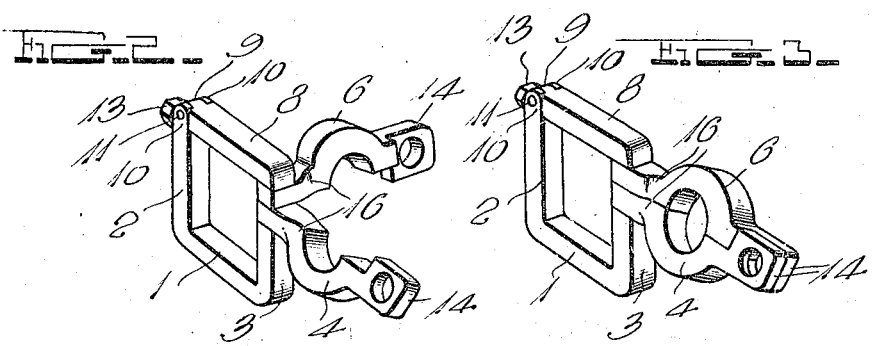
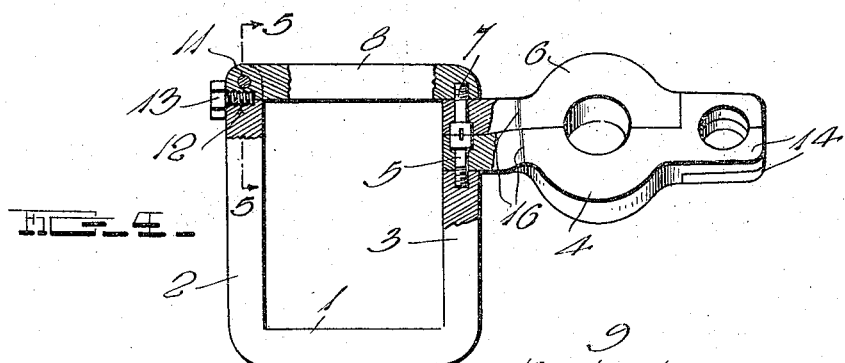
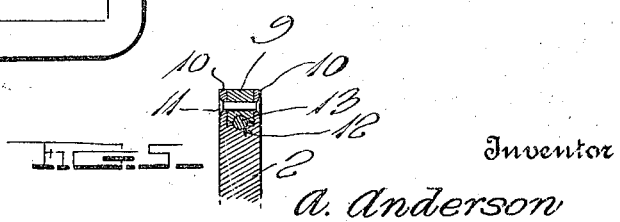
Witness
H. Woodard
Inventor
A. Anderson
By H. B. Willson & Co.
Attorneys Patented June 24, 1924.

1,498,772

UNITED STATES PATENT OFFICE.

AXEL ANDERSON, OF ASHTABULA, OHIO.

STARTING-CRANK LOCK.

Application filed January 25, 1923. Serial No. 614,874.

*To all whom it may concern:*

Be it known that I, AXEL ANDERSON, a citizen of the United States, residing at Ashtabula, in the county of Ashtabula and State of Ohio, have invented certain new and useful Improvements in Starting-Crank Locks; and I do declare the following to be a full, clear, and exact description of the invention, such as will enable others skilled in the art to which it appertains to make and use the same.

My invention has for its principal object to provide a simple and inexpensive, yet a highly efficient and reliable lock for the starting cranks of automobiles, and to this end, a further aim is to make novel provision for attaching the lock to the front transverse bar of a chassis frame.

In constructing the device, a collar is provided to extend around the above-named chassis bar, this collar being formed of two pivotally united sections, each of which carries a crank-engaging arm, the two arms being intended to be locked together to hold the crank. While these arms are movable away from each other when the two sections of the collar are relatively moved to apply the device, it is a further object of the invention to provide novel means whereby the collar sections and the arms are held in proper relation after the device is once attached to the machine.

With the foregoing in view, the invention resides in the novel subject matter hereinafter described and claimed, the description being supplemented by the accompanying drawing.

Figure 1 is a perspective view showing the application of my invention.

Figures 2 and 3 are perspective views of the lock detached from the automobile.

Figure 4 is a side elevation partly in vertical section.

Figure 5 is a vertical transverse sectional view on line 5—5 of Fig. 4.

In the drawing above briefly described, the numeral 1 designates a U-shaped yoke having one of its arms 2 of greater length than its other arm 3. A crank-engaging arm 4 is pivotally mounted on the upper extremity of the shorter arm 3, by means of a screw or other suitable pivot 5, while a complemental arm 6 is pivoted by a screw or the like 7 to a horizontal bar 8 which normally closes the upper end of the yoke 1. The bar 8 is suitably pivoted to the upper extremity of the longer yoke arm 2, and in the present showing, said bar is reduced at one end to form a knuckle 9 which is received between a pair of knuckles 10 rising from the arm 2, a pivot pin 11 being passed through the knuckles. This arrangement permits the bar 8 to swing upwardly and outwardly away from the yoke 1 when attaching the latter to the front transverse chassis bar of an automobile, as shown in Fig. 1. When the bar 8 is again swung downwardly, it co-operates with the yoke in forming a collar to securely attach the lock to the machine and for the purpose of preventing this collar from accidentally opening, a threaded opening 12 is jointly formed in the arm 2 and the bar 8, a screw 13 being threaded into this opening as shown clearly in Figs. 4 and 5.

The crank-engaging arms 4 and 6 are shaped to jointly encircle the starting crank and while any suitable means may be provided for locking these arms together, I prefer to provide them with overlapping ears 14 having alined openings through which a padlock 15 may be passed. The two arms are given a slight twist as indicated at 16; to position them in an inclined plane for properly engaging the crank when it declines from its bearing in the manner shown in Fig. 1.

By providing the construction shown, a device is provided which is simple and inexpensive, yet it will be in every way desirable. As excellent results may be obtained from the details herein disclosed, they are preferably followed, but within the scope of the invention as claimed, numerous minor changes may be made.

I claim:

1. A starting crank lock comprising a rectangular collar adapted to surround a front chassis bar, said collar being formed of two sections pivoted together at one end to permit said sections to be closed around the chassis bar, the pivoted end of said collar sections being jointly formed with a threaded opening, a screw threaded in said opening to hold the collar closed around the chassis bar, and crank engaging means carried by said collar.

2. A starting crank lock comprising a collar adapted to surround a front chassis bar, said collar being formed with a section including arms for extending upon opposite sides of the chassis bar and a second section connected with one of the arms of the first section and terminating in spaced relation to the free end of the second arm of the first section, crank embracing arms positioned between the free end of the second section of said collar and the last mentioned arm of the first section of said collar, and fasteners passing through the crank embracing arms and into the second section of said collar and arms of the first mentioned section of said collar to pivotally mount said crank engaging arms for swinging movement into and out of an operative position.

3. A starting crank lock comprising a U-shaped yoke having one of its arms longer than the other, a horizontally movable crank-engaging arm pivoted on the upper extremity of the shorter arm, a downwardly closing bar pivoted to the upper extremity of the longer arm, said yoke and bar forming a collar to surround a front chassis member, said bar and said longer arm being jointly formed with a threaded opening, a screw threaded in said opening to hold the yoke and bar against relative movement, and a second crank-engaging arm pivoted to the free end of said bar, the two crank-engaging arms being adapted to be locked together around the crank.

In testimony whereof I have hereunto affixed my signature.

AXEL ANDERSON.